(12) United States Patent
Shi et al.

(10) Patent No.: US 7,146,037 B2
(45) Date of Patent: Dec. 5, 2006

(54) VLSI NEURAL FUZZY CLASSIFIER FOR HANDWRITING RECOGNITION

(75) Inventors: Bingxue Shi, Beijing (CN); Guoxing Li, Beijing (CN)

(73) Assignee: Winbond Electronics Corp., Hsinchu (TW)

( * ) Notice: Subject to any disclaimer, the term of this patent is extended or adjusted under 35 U.S.C. 154(b) by 686 days.

(21) Appl. No.: 10/064,423

(22) Filed: Jul. 12, 2002

(65) Prior Publication Data
US 2004/0008883 A1    Jan. 15, 2004

(51) Int. Cl.
| G06K 9/00 | (2006.01) |
| G06K 9/62 | (2006.01) |
| G06F 15/18 | (2006.01) |
| G06E 1/00 | (2006.01) |
| G06E 3/00 | (2006.01) |
| G06G 7/00 | (2006.01) |

(52) U.S. Cl. ............... 382/158; 382/187; 382/224; 706/2; 706/20

(58) Field of Classification Search ............... 382/158, 382/187, 224; 706/2, 20
See application file for complete search history.

(56) References Cited

U.S. PATENT DOCUMENTS 4,752,957 A * 6/1988 Maeda ................ 704/204
6,341,275 B1 * 1/2002 Shi et al. ............... 706/33
6,393,413 B1 * 5/2002 Jorgensen et al. ......... 706/20
6,707,496 B1 * 3/2004 Yang et al. ............. 348/303

OTHER PUBLICATIONS

Li Guoxing, A modified Current Mode Hamming Neural Network for Totally Unconstrained Handwrittein Numeral Recognition, 1998, IEEE, 0-7803-4859-1, p. 1857-1960.*
Jim Austin, "The Cellular Neural Network Associative Processor, C-NNAP", May 1996, IEEE Monograph, p. 1-29.*

* cited by examiner

Primary Examiner—Joseph Mancuso
Assistant Examiner—Jonathan Schaffer
(74) Attorney, Agent, or Firm—Jiang Chyun IP Office (57) ABSTRACT

A handwriting recognition device using fuzzy logic and cellular neural network for unconstrained handwritten numeral classification is provided. The current mode VLSI classifier has a I/O circuit for inputting and outputting a plurality of membership functions. An extraction unit comprising a CCD extractor with a CNN structure and a compression unit receives a to-be-recognized character having a plurality of input features for generating a plurality of features values after compression. A membership function generator stores the plurality of membership functions and receives the plurality of features values to generate a plurality of current-type membership degrees. A plurality of switched-current integrators receives the plurality of current-type membership degrees for generating a plurality of synthesis membership degrees. A k-WTA circuit is provided for comparing the plurality of synthesis membership degrees and output the plurality of synthesis membership degrees as well as the corresponding characters in an order of magnitude.

8 Claims, 6 Drawing Sheets

VLSI NEURAL FUZZY CLASSIFIER FOR HANDWRITING RECOGNITION

BACKGROUND OF INVENTION

1. Field of the Invention

The present invention relates to a handwriting recognition device; and more particularly, to a handwritten numeral recognition device using fuzzy logic and cellular neural network.

2. Description of Related Art

The influx of personal digital assistants (PDA) and touch-screen electrical appliances has created a demand for a small, instantly-recognizable, and robust handwritten character translator (HCT). Handwriting recognition devices are devices that attempt to identify handwritten images based upon an existing character in order to output recognized images. One inherent difficulty of applications related to handwritten character recognition is that handwritten characters are variable on an individual basis. Moreover characters are usually separated into alphabets, numerals, and symbols despite the difference characters of the language itself. Therefore it is advantageous to separate the handwriting recognition into individual systems for increasing its speed, robustness, and efficiency.

In order to accommodate handwritten recognition devices to an individual's handwriting style, typical handwritten recognition devices will firstly operate in software using a trained character, whereby a user will place the device in a training mode and enter in the user's numeral on a regular basis via a graphic user interface, such as a digital writing tablet. The numerals input by the user are then used as a template for use in comparing other numerals that are handwritten by the user via the graphical user interface. In such a case, however, the operation of the existing handwritten character recognition devices is based on the assumption that an individual's writing style is relatively uniform. Thus, if a user's handwriting varies due to fatigue or stress, the handwritten characters may be unrecognizable. Thus, to ensure recognition, a user may often be required to write slowly and carefully. In addition not only do individuals have different handwriting styles, but an individual's own handwriting may change over time and moreover the characters may be smaller or larger in different instances. Devices attempting to perform handwritten character translation may make incorrect decisions due to an inability to accommodate a variety of handwritten character shapes and sizes. In addition, these devices would be relatively slow due to the software implementation. Finally, the existing handwritten character recognition devices suffer the disadvantage of being user-specific, and would not work for another user because of the individual variations in handwriting.

Because of the fuzzy nature of human handwriting, it makes sense to adapt "fuzzy logic" into the handwriting recognition device. The "fuzzy logic" control theory is well known in the art of data processing. Rather than evaluating the two values "TRUE" and "FALSE" as in digital logic, fuzzy terms admit to degrees of membership in multiple sets so that fuzzy rules may have a continuous, rather than stepwise, range of truth of possibility. Therefore non-identical handwritten numeral from same or different users can be approximated using fuzzy logic for fast and robust handwriting recognition. The conventional method of fuzzy recognition relies upon the maximum membership principle:

$$\mu_{A1}(\mu_0) = \max\{\mu_{A1}(\mu_0), \mu_{A2}(\mu_0), \Lambda, \mu_{AN}(\mu_0)\} \quad (1)$$

therefore $\mu 0 \subset A_1$, where $A_1, A_2, \Lambda, A_N$ are N standard characters $\mu_0$ is the object to be recognized and N is the total number of classes. This conventional method is a single factor equation and can only recognize the handwritten character as a whole and find the closest standard character for to-be-recognized character. Therefore the conventional method is very restricted in terms of speed, robustness, and accuracy. To enhance system performance, it is necessary to find two or more of the closest standard characters for the to-be-recognized character and the standard characters.

Generally, analog fuzzy logic is constructed by multi-value logic circuit units, which may be of a voltage type or a current type. For conventional voltage type circuits, operational amplifiers are required for summation or subtraction operations to voltages, which makes the circuit complicated. On the contrary, the current type circuit is capable of proceeding summation and subtraction operations to currents and thus simplifies the circuit and is used in present invention. In addition, the operating speed of a current type circuit is generally higher than that of the voltage type circuit because the gain bandwidth of the operational amplifier restricts the operating speed of the voltage type circuit. Moreover, in a voltage type fuzzy logic circuit, switch capacitors are usually required, which increases the size of a chip for the circuit because a large chip area is required to fabricate a capacitor. The use of switch capacitors also increases the complexity of manufacturing a chip for the circuit as two polysilicon layers are required for fabricating a switch capacitor. The fabrication of a current switch for the current type fuzzy logic can be done by standard digital CMOS technology and thus reduce the complexity of manufacturing a chip for the circuit. Accordingly, the present invention provides a switch current type fuzzy processor for high-speed character recognition.

Furthermore, a handwritten character is mostly unique even written by the same user because it can vary in size, magnitude, curvature, stroke, and etc . . . Therefore a fuzzy logic handwritten character translator itself is not sufficiently fast and robust in recognizing the entire character. As a result, it is a necessary to include a feature extractor that capable of high-speed parallel signal processing. Cellular neural network (CNN) is the best choice because it allows real-time signal processing found within a digital domain and local interconnection features for VLSI implementation. A feature extractor uses a 24×24 pixels CNN to perform extraction of the handwritten numeral image. The extracted image is then decoded into various feature groups consisting of different feature, a feature is the primitive of a character such as a dot, line, or curve.

SUMMARY OF INVENTION

It is an object of the present invention to provide a handwriting recognition device using CNN and fuzzy logic to recognize numerals despite variations in the character. Furthermore, the present invention provides a handwriting recognition device that can directly classify the normalized handwritten digit image.

It is an object of the present invention to provide a handwriting recognition device that have the properties of parallelism, trainability, and robustness.

It is an object of the present invention to have a smart structure that allows membership function programmability and output configurability.

It is a further object of the present invention to provide a handwritten character recognition device capable of identifying handwritten numeral regardless or the size or scale of the handwritten numeral.

It is a further object of the present invention to provide a current-type handwriting recognition device that is efficient, low cost, and easy to fabricate in VLSI.

In order to achieve these and other objects, the present invention provides a handwriting recognition device namely the classifier comprising two main parts. The first extraction unit comprises a 24-bits connected component detector (CCD) feature extractor using CNN and a feature compression block; and the second membership function generator comprises a 10×10 membership function generator (MFG) array, a 10 switched current (SI) integrators, and a 11-port k-winner-takes-all (k-WTA) circuit.

According to the present invention, the handwriting recognition device uses fuzzy logic and CNN to determine the optimum numeral candidate from a library of predetermined sets of character sequences. Specifically, the handwriting recognition of the present invention uses a two dimensional synthetic membership function in order to classify the extracted features of a scanned numeral image. The synthetic membership function represents a degree of an input numeral belonging to an object class as a whole in terms of different features. A "feature" is defined as a basic component of a handwritten character such as a dot, a curve, a line such that a handwritten character is composed of a combination of features or feature groups. The weighted sum synthetic membership function has better generalization ability since it can reinforce the contribution of different feature groups to different classes. As a result, the weighted sum synthetic membership function is much faster and more robust by recognizing the features and feature groups of a scanned image. There are many choices for the synthesis functions. The most frequently used are the minimum-finding function but it is not suitable for character recognition since it only emphasizes a local feature and neglect other features. The summation function is able to include the relations between all features whereby it is suitable for pattern recognition. Therefore the summation function is adopted in the present invention. When the weighted sum synthetic membership function is combined with the maximum membership principle, it can give the final recognizing results.

In accordance to the preferred embodiment, the current mode VLSI classifier has a I/O circuit for inputting and outputting a plurality of membership functions. An extraction unit comprising a CCD extractor with a CNN structure and a compression unit receives a to-be-recognized character having a plurality of input features for generating a plurality of features values after compression. A membership function generator stores the plurality of membership functions and receives the plurality of features values to generate a plurality of current-type membership degrees. A plurality of switched-current integrators receives the plurality of current-type membership degrees for generating a plurality of synthesis membership degrees. A k-WTA circuit is provided for comparing the plurality of synthesis membership degrees and output the plurality of synthesis membership degrees as well as the corresponding characters in an order of magnitude. The I/O circuit provides the final recognizing result.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
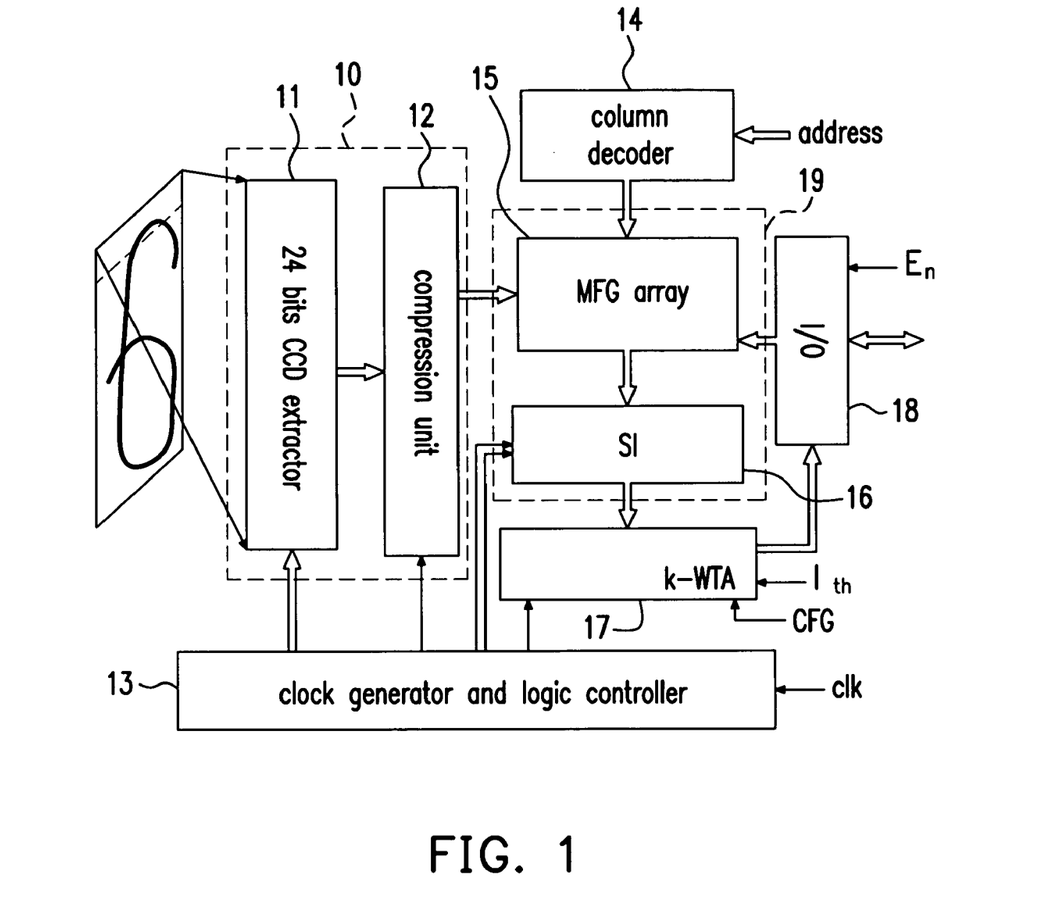
FIG. 1 is a schematic diagram of the structure of the classifier according to the preferred embodiment of the present invention.

Please refer to FIG. 1, the structure of the neural-fuzzy classifier of the present invention for handwriting recognition is illustrated, which comprises an extraction unit 10, a membership function generator 19, a clock generator and logic controller 13, a column decoder 14, an I/O circuit 18, and k-WTA circuit 17, wherein the I/O circuit 18, and k-WTA circuit 17 have 11 ports. The extraction unit 10 further comprises a CCD extractor 11 and a compression unit 12, wherein the CCD extractor is 24 bits. The membership function generator 19 further comprises a 10×10 programmable membership function generator (MFG) array 15, and a SI integrator 16, wherein the SI integrator 16 has 10 switches. In the membership function generator 19, the weighted-sum synthetic membership function used is shown in equation (2):

$$\mu(X) = \sum_{j=1}^{J} w_{ij} \sum_{k=1}^{K} m_{jk,x} \mu_{ijk}(m_k)$$

Where i=1, 2, . . . , N is the index of class number, J is the number of feature groups, $W_{ij}$ is the weight of the $j^{th}$ groups feature belonging to the $i^{th}$ class, K is the length of each group feature codes, $m_{jk,x}$ is the input feature code and $\mu_{ijk}$ ($m_{ij}$) is the membership of feature code $m_{i,}$ belonging to the $i^{th}$ class. For the present invention, N=10, J=8, and K=10 are used in the preferred embodiment. En is an enable signal for enabling MFG array 15 via I/O circuit 18 to control the operation of the classifier. The logic operations of the classifier are controlled by a number of non-overlapping clock signals ck1 and ck2 by the clock generator and logic controller 13.

The 24-bit CCD extractor 11 is a cellular neural network structure that can be easily implemented in CMOS circuitry. The CCD extractor 11 scans a normalized 24 pixels×24 pixels handwritten black and white image of a numeral in two directions and two diagonal lines. The pixels of the normalized numeral consisting of different features are black and the rest of the image pixels is white, however inverted images can also adapted. The raw data of the scanned image from the 24-bit CCD extractor 11 is sent to the compression unit 12 for compression into smaller data. The peripheral edge pixels of the image are always white so the effective image size decreases to 22 pixels×22 pixels. The scanned image therefore contains 80 bits of CCD feature codes which includes two added dummy bits. These compressed codes will be fed into the 10×10 pre-programmed MFG array in eight time cycles which are controlled by the clock generator and logic controller 13.

The I/O circuit 18 provides the programming codes of the membership functions under the control of the column decoder 15. The results $\mu(X)$ is immediately outputted to and stored in the 10 SI integrator 16 until all the features codes are transmitted. The maximum membership function is applied to the results of the weighted sum synthetic membership function by the k-WTA circuit 17 to generate the highest matching results. The results are then sent to the I/O circuit 18 to give the final recognizing results.

Figure 2:
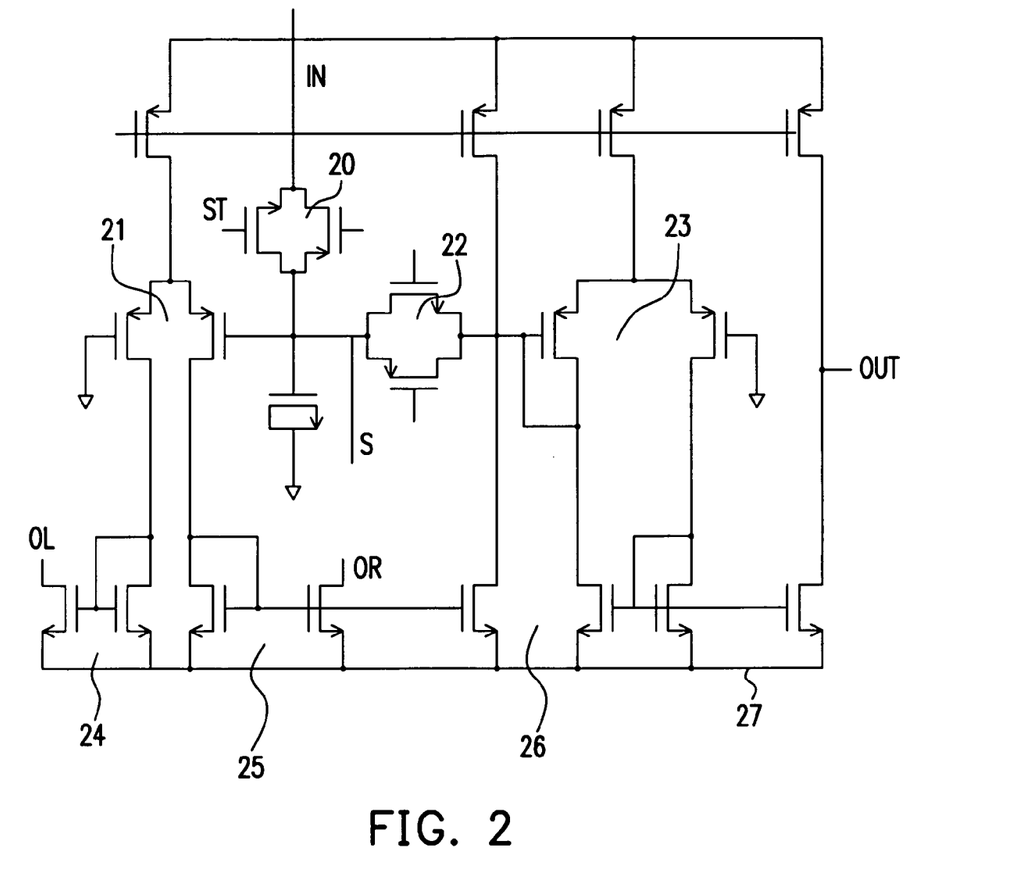
FIG. 2 is a circuit diagram of a cell circuit of the CCD extractor according to the preferred embodiment of the present invention.

FIG. 2 illustrates a single cell circuit of the CCD of the present invention. The 24-bit CCD extractor is constructed by 24 cascaded cells to form the 24×24 pixels feature extractor. Each cell circuit comprises 4 cascaded current mirrors connected to the output of the cell circuit. There are 4 transmission gates controlling the input of the CCD extractor. The input signal of the CCD extractor 11 is connected to the input of transmission gate 20, transmission gate 21 and 23 through a transistor. The output of transmission gate 20 is connected to a node further connected to the input of transmission gates 21 and the gate of transmission gate 22, and the gate of transmission gate 20 is connected to a ST signal. The input of transmission gate 21 is connected to the input signal, the gate of the transmission gate 21 is connected to the output of the transmission gate 20, the other gate of transmission gate 21 is connected to ground, and the output of transmission gate 21 is connected to the current mirror 24. The input of transmission gate 22 is connected to the output of transmission gate 20, the gate of the transmission gate 22 is connected to a WR signal. The input of transmission gate 23 is input signal of the CCD extractor 11, the gate of transmission gate 23 is connected to the output of transmission gate 12, the other gate of transmission gate 13 is connected to ground, and the output of transmission gate 13 is connected to current mirror 17 and further to the output of the CCD extractor. Current mirrors 14, 15, 16, and 17 are connected in cascaded manner. HSPICE simulation of this CCD extractor gives good performance.

The CCD feature extractor scans a normalized 24×24 pixels handwritten black numeral image row by row in horizontal direction and two diagonal lines. The peripheral pixel of the image is always white so the effective image size is 22×22 pixels. There are 4 bits in each feature code but the first bit is discarded because it only provides information of normalization of the image, therefore each feature code has 3 bits because the scanned images are normalized in the preferred embodiment. The 3×22 bit feature codes are thus obtained after scanning all the rows of the image and the feature codes are read into a corresponding 4×22 register array in the proper order. A diagonal line is obtained by scanning and shifting the $i^{th}$ original pixel in the $i^{th}$ row of the image to the corresponding bit of the last register column. After scanning all the rows of the image, the data in the register array is sent back into the CCD feature extractor column by column to get 9 bits of CCD features, where the diagonal line gives 3 bits results and the other three columns give 6 bits. Furthermore, the edge bits in each column are left idle and therefore the data is reduced to 20 bits. The 20 bits of the middle of each column are compressed by the feature compression unit 12 to 10 bits.

Figure 3:
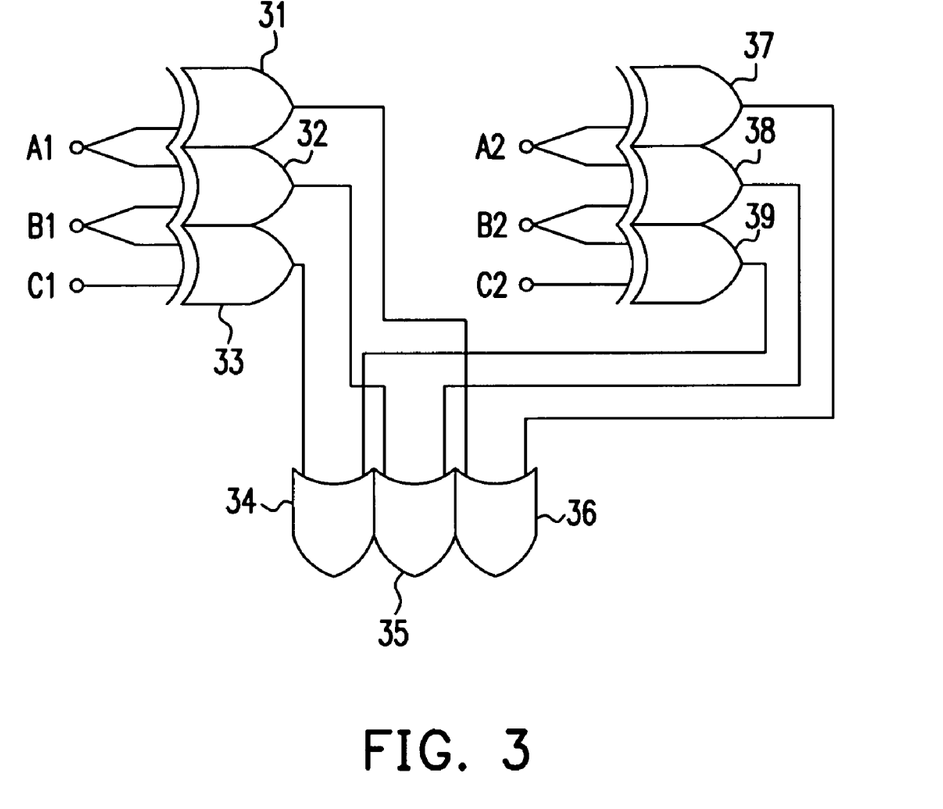
FIG. 3 is a circuit diagram of the feature compression unit according to the preferred embodiment of the present invention.

FIG. 3 shows the logic circuit of the feature compression unit 12. The feature compression unit 12 comprises at least 3 XOR gates connected together to control the logic of the templates A, B, and C. XOR gates 31, 32, and 33 are coupled together like a triplet, wherein XOR gates 31, 32 share an input A1, and XOR gates 32, 33 share an input B1. XOR gates 37, 38, and 39 are coupled together like a triplet, wherein XOR gates 37, 38 share an input A1, and XOR gates 38, 39 share an input B1. XOR gates 34, 35, and 36 are coupled together like a triplet and their outputs are the templates A, B, and C respectively. Wherein the input of XOR gate 34 is coupled to both the output of XOR gate 33, 37, the input of XOR gate 35 is coupled to both the output of XOR gate 32, 38, and the input of XOR gate 36 is coupled to both the output of XOR gate 31, 37. Since both the template B and bias input I of the CCD extractor 11 are zero, only one row of the template A takes effect. This feature compression unit is easily implemented in CMOS circuit.

As a result, the feature compression unit 12 outputs 39 bits where 10 bits are from each of the 3 columns and 9 bits are from the diagonal line are acquired each in the horizontal and vertical directions. A total of 80 bits including 78 scanned bits and 2 dummy bits are sent to the programmable MFG under control of clock generator and logic controller 13. 10×10 bits are sent to the programmable MFG every clock cycle, and the 78 bits of scanned data requires 8 clock cycle to complete, wherein 1 dummy bit is added every four cycles.

Figure 4:
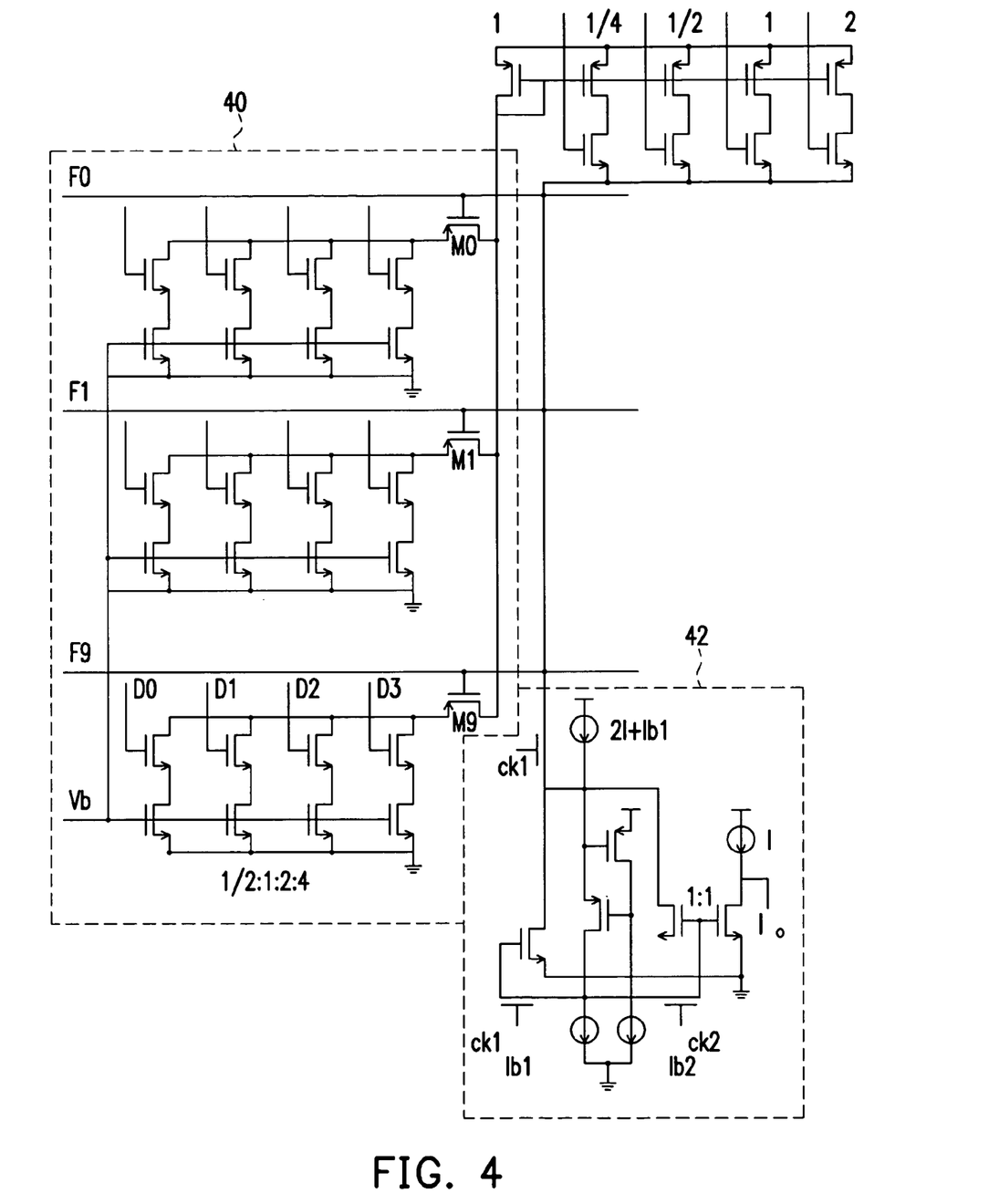
FIG. 4 is a circuit diagram of one column of the fuzzy weighted sum of the membership function generator according to the preferred embodiment of the present invention.

FIG. 4 shows one column of the 10×10 MFG array 15 with 3 membership function memory units shown and the 10 SI integrator 16. The circuit unit A 40 is a fully symmetrical membership function array in which all the NMOS transistors are of the same size. There are 10 columns in the 10×10 MFG array and each column has 10 membership function memory units which store the membership degree corresponding to the $i^{th}$ feature value of the $j^{th}$ feature of the $i^{th}$ standard character. The membership function memory unit comprises at least 9 transistors, wherein 8 transistors are used in pairs in the aspect ratio 0.5:1:2:4 and controlled by control signals D0, D1, D2, and D3, respectively and one transistor such as M0, M1, and M9 acts as a gate by receiving high and low signals. The MFG array are addressed by the input feature signals F0–F9 from the feature compression unit 12 in combination with the adjacent but non-overlapping timing signals CK1 and CK2 pulses, each corresponding to an input feature. $^{thtttth}$tjsadfThe 80 bits scanned image is sent to the programmable MFG for feature recognizing. The 10 columns of feature codes calculate the fuzzy weighted sum core of the membership function generation using fuzzy logic from equation (2). An off-chip EPROM unit stores the genetic algorithm off-line learning which will later become control codes for the membership function generator. The feature codes are compared by the membership functions against the standard characters stored in the EPROM. The membership functions are programmable and controlled by digital control signals D0–D3 and the value of all the membership function ranges from 0 to $7.5 \times I_{ref}$ in steps of $0.5 \times I_{ref}$, wherein the $I_{ref}$ is a reference current set at 4 μA. The weight $w_{ij}$ is programmable and realized by part in dashed box and the value ranges from 0 to 3.75 in steps of 0.25. A group of 10-bit feature codes are sent to the 10×10 programmable MFG 15 array generating 10 weighted part-sum currents in every clock cycle.

Figure 5:
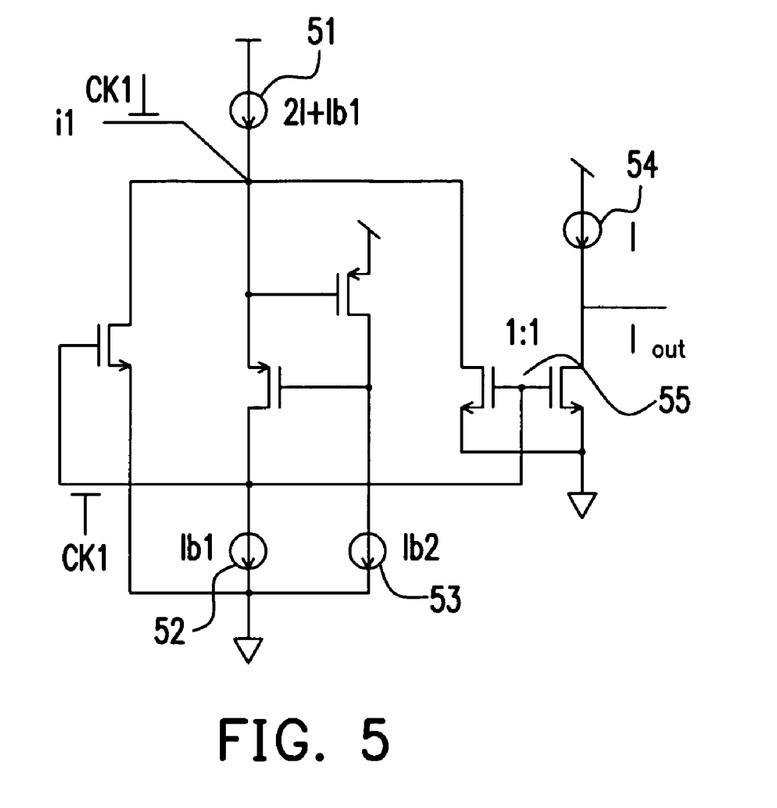
FIG. 5 is a circuit diagram of the SI integrator according to the preferred embodiment of the present invention.

In FIG. 5, the SI integrator 16 performs an accumulation operation on the current-type values of weighted membership degrees to obtain the current-type value of a synthesis membership. The SI integrator 16 is implemented by a switched-current technique which introduces the second generation switched-current storage to overcome disadvantages of the first generation switched-current storage. To stabilize the drain voltage of a storage transistor, a RGC (Regulated-Gate Cascode) structure is adopted to construct a storage unit. Although the fully differential integrator can be adopted in this classifying system, the single ended RGC integrator is preferably used because of its simplicity. The SI integrator 16 accumulates the input current one by one in each cycle. Therefore the 80-bit scanned image requires 8 clock cycles to complete the transmission. Timing controls of the switches are controlled by two non-overlapped clocks CK1 and CK2 shown in FIG. 4. In the CK1 clock cycle an input current $I_1$ is sent to the integrator, and in CK2 clock cycle the output current $I_{low}$ is generated. The switched-current integrator 16 will accumulate all the weighted part-sum currents in every clock cycle and the total weighted sum currents are obtained and outputted to the 11-port k-WTA 17 after 8 cycles. The output of SI integrator 16 is regulated by a current mirror with a 1:1 ratio with a current source of I connected to the output.

Figure 6:
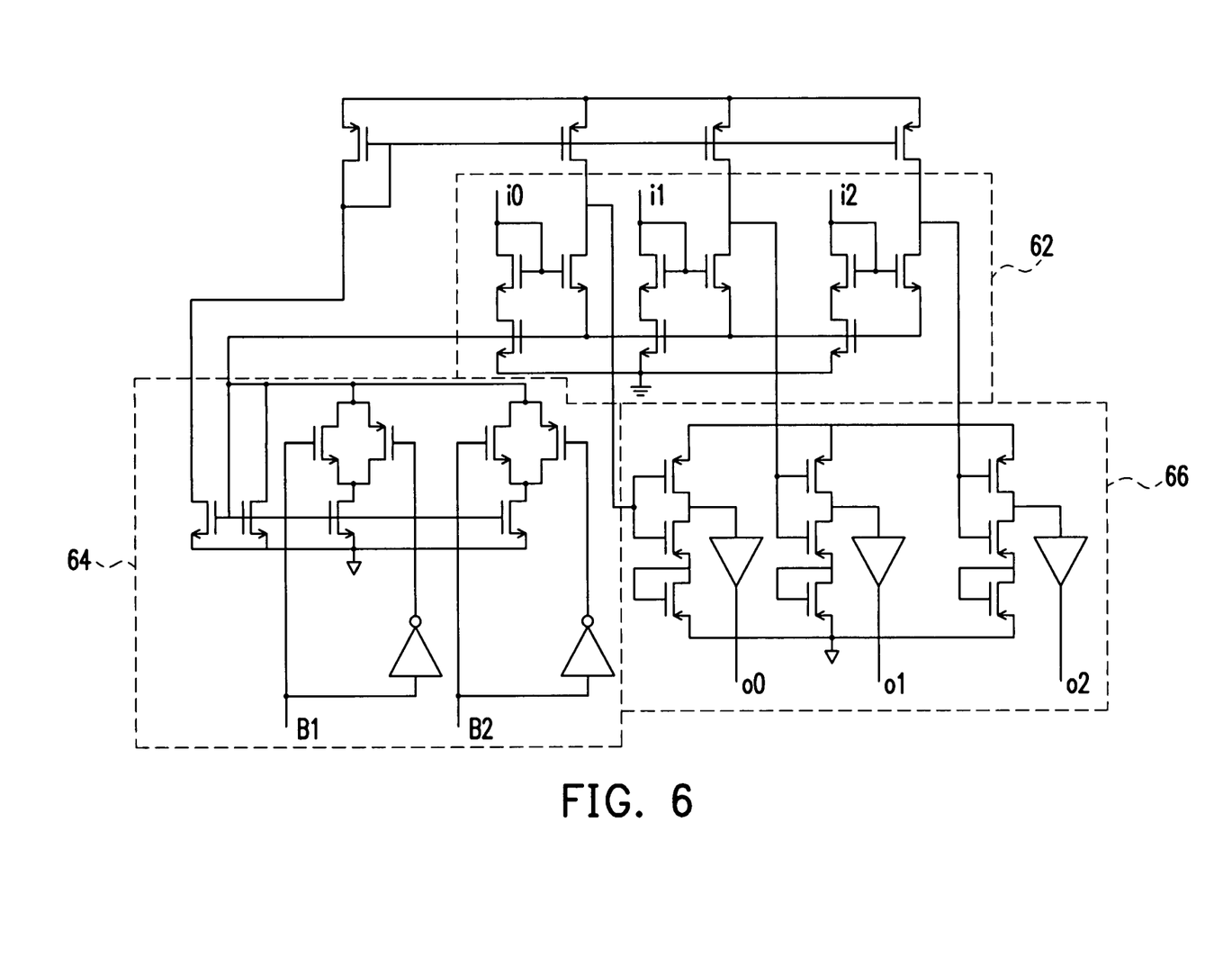
FIG. 6 is a circuit diagram of the k-WTA according to the preferred embodiment of the present invention

The 11-port k-WTA circuit 17 is shown in FIG. 6 which comprises a circuit unit A 62, a circuit unit B 64, and a circuit unit C 66. The k-WTA circuit is used to compare and sort the synthesis membership degree currents corresponding to the N standard characters and the to-be-recognized character to sequentially output high voltage pulses on the outputs corresponding to the N standard character in order of magnitude of the current as a recognition result. If the classifier is used in parallel or cascade to improve system performance, the k-WTA circuit must be expanded in order to compare and sort M number of classifiers times N standard characters. Therefore the circuit unit A is easily expandable to a larger network depending on its application. All transistors work in strong inversion therefore the WTA network is high speed. The circuit unit A 62 comprises three identical input units where $i_0$, $i_1$, and $i_2$ designate three input currents representing three synthesis membership degrees which are directed and output to the circuit unit C 66. The k-WTA circuit 17 receives the input currents to find the maximum among them and output three voltage signals indicating the maximum one. A number of control logic signals B1 and B2 are sent to the circuit unit A for enabling the individual maximum-finding circuit by a "high" signal. A voltage $V_b$ is applied to circuit unit A so a current is flown through the differential transistors having the maximum input voltage and produce a drain current $I_t$ when the drain current of other differential transistors are zero. The circuit unit B is an output circuit of the k-WTA network. The clock cycle CK1 and CK2 controls the current source of the diodes and the final output $I_O$ of the 11-port k-WTA circuit 17 is passed through a 1:1 current mirror. The k-WTA selects largest k value of each group of feature codes at one time from k classes with a simple set of complementary features. If signals B1 and B2 are zero voltage levels, the value of k is 1 so the WTA is reconfigured as 1-WTA. When any one of the B1 or B2 is high voltage level, the value of k becomes 2 so the WTA becomes 2-WTA.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A handwritten numeral classifier using fuzzy logic and cellular neural network, comprising:

an extraction unit using cellular neural network for receiving a scanned image having a plurality of input features, wherein the extraction unit is constructed of 24 cascaded cells to form the 24×24 pixels feature extractor comprising of a plurality of cell circuits, wherein each cell circuit comprise of 4 cascade currant mirrors connected to the output of the cell circuit, the extraction unit having 4 transmission gates controlling the input of the extraction unit, wherein the input signal of the extraction unit is connected to the input of the transmission gates through a transistor, and compressing the received data of the scanned image to generate a plurality of feature values;

a membership function generator using fuzzy logic for storing a plurality of membership functions and receiving the feature values to generate a plurality of synthesis membership function degrees for the plurality of input features;

a k-WTA circuit for receiving the plurality of synthesis membership function degrees from the membership function generator and outputting the synthesis membership degrees in order of magnitude;

an I/O circuit for inputting programming codes to the membership function generator through off-chip memory units and receiving the synthesis membership degrees from the k-WTA circuit to output a final recognizing result of the scanned image; and a clock generator and logic controller for generating clock cycle and control logic signals for controlling timing of and logic for operations of the extraction unit, membership function generator, and the k-WTA circuit.

2. The classifier in claim 1, wherein the I/O circuit and the k-WTA circuit both have 11 corresponding ports.

3. The classifier in claim 1, wherein the membership function generator further comprising:

a membership function generator array respectively corresponding to each one of the plurality of the input features for storing the plurality of membership functions and generating a plurality of current-type membership function degrees for the plurality of the input features; and a plurality of switched-current integrator corresponding to the membership function generator army for receiving the plurality of membership function degrees and generating a plurality of synthesis membership degrees.

4. The classifier in claim 3, wherein the membership function generator array is 10×10.

5. The classifier in claim 3, wherein the number of SI integrator includes 10.

6. The classifier in claim 5, wherein each of the plurality of SI integrators includes a plurality of storage units constructed by a Regulated-Gate Cascade structure.

7. The extraction unit in claim 1, wherein the extraction unit further comprising: a connected components detector extractor with a cellular neural network structure for speedily extracting the input features of a scanned numeral image; and a compression unit for compressing bits of the input features into small and meaningful feature values and sending the compressed data to the membership function generator.

8. The classifier in claim 7, wherein the CCD extractor is 24 bits.

* * * * *